April 21, 1964     D. J. WALKER     3,129,691
ILLUMINATED DIAL POINTER
Filed April 6, 1962
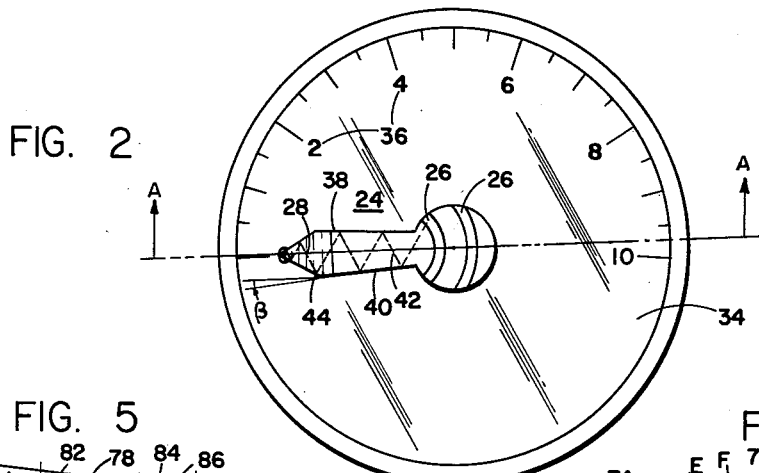
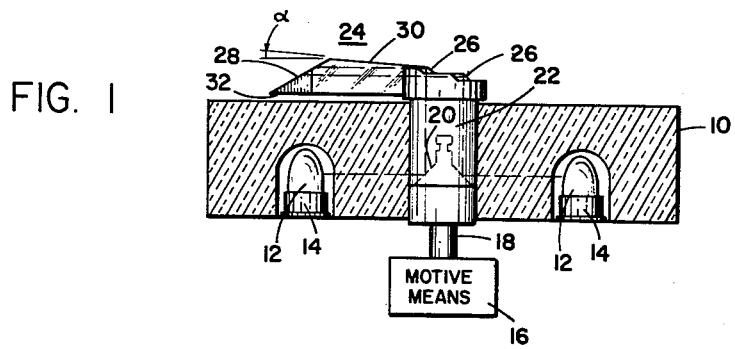
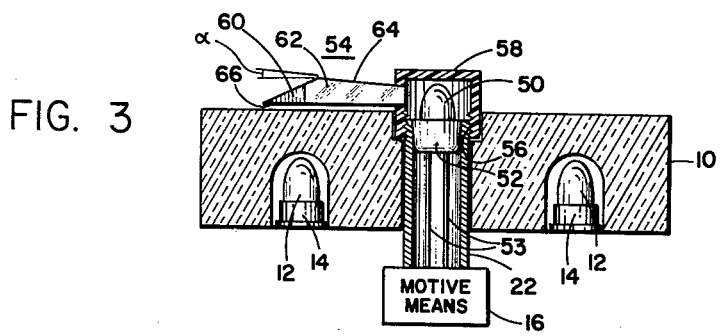
INVENTOR.
DAYTON J. WALKER
BY Charles J. Ungemach
ATTORNEY.

United States Patent Office 3,129,691
Patented Apr. 21, 1964

3,129,691
ILLUMINATED DIAL POINTER
Dayton J. Walker, Minneapolis, Minn., assignor to Minneapolis-Honeywell Regulator Company, Minneapolis, Minn., a corporation of Delaware
Filed Apr. 6, 1962, Ser. No. 185,621
10 Claims. (Cl. 116—129)

This invention pertains generally to indicating instruments and more specifically to a means for obtaining uniform illumination throughout the pointer section of an indicator utilizing either remote light sources or built-in light sources.

This invention solves the problem of decreasing illumination when using long pointers by increasing either the width or the height or both of the pointer to increase the angle of reflection within the pointer section. When this light is reflected into the tip portion it has a large enough angle so that the converging sides of the tip will not be able to reduce the angle of reflection enough to permit light to pass through the exterior surfaces of the tip before it is reflected to the point or extremity of the tip section.

It is the general object of this invention to disclose a method of obtaining uniform illumination throughout a pointer and tip section of greater dimensions than previously possible.

Further objects and other features of the invention will be understood more clearly from a study of the following detailed description and accompanying drawings in which:

FIGURE 1 is a cross-sectional side view of an indicator disclosing one embodiment of a pointer utilizing the concept of this invention, FIGURE 2 is a top view of the indicator shown in cross section in FIGURE 1, and FIGURE 3 is a cross-sectional view similar to FIGURE 1 of another embodiment of a pointer utilizing the teachings of this invention.

FIGURE 4 is a diagram showing how the angle of light rays increases with respect to one surface of a translucent body when the opposite sides are increasing in width, and FIGURE 5 illustrates how the angle of reflection of light rays in a translucent body decreases when the sides are converging until the light ray is no longer reflecting but instead passes through a surface.

In FIGURE 1 the block of translucent material 10 houses one or more sources of radiant energy such as light bulbs 12 which are positioned within holding means 14 and are supplied with power by means not shown. The material 10 is shown as taken through section lines A—A in FIGURE 2. A motive means 16 has an output shaft means 18 which is connected to or may have a conical reflecting surface 20. The shaft means 18 is attached to a hub means or center portion 22. A pointer section generally indicated as 24 is attached to the hub 22 and includes beveled reflecting surfaces or reflecting means 26 and a tip portion 28. The pointer means is generally translucent and therefore light or energy conducting. The term pointer means may refer to the entire pointer or may include as small a portion as the portion between the reflecting means and the tip portion. The hub 22 is also translucent and will permit the passage of energy in the form of one or more types of radiation. An upper surface 30 of the pointer means 24 increases in height at an angle α (alpha) with respect to a lower surface 32 from the hub portion or reflecting means toward the tip 28. The lower surface 32 could be angled with respect to a horizontal line as it is merely necessary that one surface be inclined with respect to the opposite surface. In one particular application it was found that an angle of 4° provided an optimum. The angle will vary however with different dimensions and the invention is not restricted to an angle of 4° although it is the belief of the inventor that angles of between 0 and 10° will provide the optimum range of increase in the height dimension. The lower surface 32 may be coated with a reflective coating to increase the reflective capabilities of the lower surface of the pointer 24. Many translucent materials will reflect radiant energy if the energy strikes the surface at a large enough angle with respect to a vertical from the surface. This phenomena is true of materials such as water and also such as Plexiglass which is one of the materials of which the indicator and pointer sections may be composed.

FIGURE 2 shows a dial face 34 with indicia generally numbered as 36 situated thereon. The pointer means generally indicated as 24 also shown with the reflective surfaces 26 and the tip portion 28. As will be noted in FIGURE 2, an angle β (beta) is shown which is the angle at which the sides increase in width with respect to a center line running from the center of the hub to the tip of the pointer 24. As can be determined the sides are inclined or at an angle, one with respect to the other, of $2\beta$. In this drawing it is shown that both sides increase at the same time and again for this particular application a total increase of 4° was found to be optimum and therefore beta is 2° since both sides are increasing at the same time. It may be noted that the sides increase in width up to a point. This point is closer to the tip than the point at which the surface 30 stops increasing height from surface 32. If it is so desired, the increase in height of surface 30 can cease at a point which is the same distance from the tip 28 as is the point where side surfaces or portions 38 and 40 cease increasing in width or at a point closer to the hub than this. Each application of the idea may have different design features depending on the requirements and still be within the invention.

The illustration of FIGURE 4 may be assumed to show one surface 70 of the pointer section which can be representative of the top surface 30 in FIGURE 1 and the other side 72 be representative of the lower surface 32. An example will be shown how the angle or light reflection increases. A dashed line 74 represents a vertical to the surface 72. Another dashed line 76 represents another vertical to the surface 72. When light rays strike a surface and are reflected, they are reflected at an angle to the surface which is the same angle as the angle at which they strike the surface. In technical terms it is said that the angle of incidence is equal to the angle of reflection. Thus, angles represented as A and B will be equal and the angles C and D will be equal and also the angles E and F will be equal. However, angles A, C, and E are not equal. This result may be explained in that the angle alpha (α), which is the angle that surface 70 is inclined with respect to surface 72, is subtracted from angle B so that an angle represented as G, which is the angle between the vertical 76 and the light ray, is greater by an angle alpha than is an angle represented as H which is the angle between the vertical 74 and the light ray where it previously struck surface 72. Each time the light is reflected from surface 70 its reflection provides an increasing angle with respect to a vertical from surface 72 by an amount equal to the inclination of one surface with respect to the other and in this illustration by an angle α. This in part illustrates the invention wherein the angle of reflection is increased in the pointer section from the hub 22 to the tip portion 28.

FIGURE 5 illustrates the converging section of the tip 28 wherein a horizontal surface representing surface 72 is again presented and another reflecting surface 78 is representative of a converging top surface of the tip 28. A light ray 80 is shown entering the diagram of FIGURE 5 at an angle J with respect to a vertical 82. When it is reflected toward the surface 78, the angle of inclination is subtracted from its reflected angle to provide a new angle K with respect to a vertical 84 from the surface 72. This decrease in reflection angle is based on the same principle as the increase in reflection angle shown in FIGURE 4. The light ray 80 is again reflected to surface 78 at a point 86 and this time the light is reflected at such a small angle shown by angle L that when it strikes surface 72 it is not reflected therefrom but instead passes through as shown by dashed line 88. If the light ray represented by 80 is not of a large reflection angle when it enters a converging portion of translucent material, it will decrease in angle of reflection very rapidly and will soon pass through the surface instead of being reflected therefrom. The teaching of this invention demonstrates that by first increasing the angle of one surface of the pointer one with respect to another to increase the angle of light reflection, the angle of reflection can be made large enough so that when it enters the converging portion, it will be reflected almost to the end of the tip portion before its angle of reflection is so small that it passes through the surface instead of being reflected.

With the description given above for FIGURES 4 and 5, it may be determined in examining FIGURE 2 that the light obtained from the light sources 12 is reflected off the conical surface 20 and is again reflected from the reflecting surface or reflecting means 26 to points within the pointer section 24. Since the sides or surfaces such as 38 and 40 increase in width one with respect to the other in the section between the hub 22 and the tip portion 28, the angle of light reflection will increase somewhat similar to that shown by dashed line 42. When the light rays reach the converging tip portion 28, the light rays will decrease in angle as explained in FIGURE 5 and at some point near the tip will pass through the surface instead of being reflected. However, this point at which light rays will pass through the surface is close enough to the end of the tip, that uniform illumination is provided throughout the pointer section 24 and the tip portion 28.

As previously mentioned, illumination of the pointer is obtained by light passing through a surface so that it can be observed by the human eye or other detecting means. In explaining this invention, the light rays which are reflected properly to enter the tip portion 28 have been shown. However, it must be realized that the light reflections are not all reflected to the tip portion 28 but that surface irregularities will cause some light to be reflected at a small angle to the surface 78 such that light will pass through the surface 78 or other similar surfaces on the pointer 24 from the hub section out to the end of tip 28. By this design, the light is directed at an increasing angle such that a large percentage of the light is increased in its angle of reflection such that there is enough light remaining within the pointer 24 to illuminate the tip section 28 after the light rays are reflected many times.

FIGURE 3 is very similar to FIGURE 1 in that it is a cross section through section lines A—A of a pointer and indicator combination with a translucent block 10 and a source of radiation such as light bulbs 12 being held in place by holding members 14 which are connected to a power source not shown. FIGURE 3 also provides a motive means 16 which is attached to a hub or shaft means 22 which may be solid or a cylinder as shown. The light bulbs 12 in the FIGURE 3 are utilized only to provide a background source of light for the indicia on the surface of the dial and are not used to provide illumination for the pointer. In this embodiment, a source of radiation such as light bulb 50 is shown held in place by holding means 52 which is attached to the hub 22. Means for providing power to the light bulb 50 is obtained from wires 53 which are placed in the center of the hub 22 and are connected to a power source within the motive means 16 by slip rings (not shown) or some other such manner. Energy from the bulb or radiation means 50 is transmitted through the translucent pointer means generally indicated as 54. The pointer means 54 is attached to the hub 22 by screw means or threads 56. The portion of the pointer means 54 which encases the light bulb 50 and is provided in this disclosure with screw threads may be referred to as a center portion or cap 58. The cap 58 in most cases will be designed to prevent the passage of light. Other means such as plotting or soldering may be used to attach cap 58 to hub 22 and I am not limiting this to screw threads. The extremity of the pointer means 54 where the surfaces start to converge may be referred to as tip 60 and the area between the tip 60 and cap 58 may be referred to as the pointer body 62. As is shown in FIGURE 3 an upper surface 64 of the pointer body 62 increases at an angle alpha with respect to a horizontal line such as the lower surface of the pointer body 66. A top view of FIGURE 3 is very similar to that shown in FIGURE 2 without the reflective portions 26 and having instead the cap 58 but the priniciple of reflection within the pointer is the same.

FIGURE 3 is shown merely to illustrate that the invention is not restricted to pointers utilizing reflective surfaces to obtain light from a source and that the invention lies in increasing at least one dimension of the pointer to obtain illuminating energy at the tip 60 of the pointer 54 and thereby provide even illumination throughout the pointer means 54.

While I have shown both height and width of the pointers increasing it is not necessary that both of these increase but merely that one dimension such as height or the dimension such as width may increase to increase the angle of reflection.

While I have shown and described two embodiments of this invention, the invention should not be limited to the particular form shown and I intend in the appended claims to cover all modifications which do not depart from the scope and spirit of the invention.

What I claim is:

1. A dial pointer assembly adapted for use with indirectly lighted instruments comprising:
   shaft means adapted to be rotated;
   reflector means rotating with and attached to said shaft means, said reflector means having a conical surface and having a predetermined diameter at the outermost portion of said conical surface;
   translucent means attached to said reflector means, said translucent means including a generally wedge-shaped portion and also including light distributing means adapted to distribute light throughout said generally wedge-shaped portion, said wedge-shaped portion of said translucent means being of a thickness less than said predetermined outermost diameter of said conical surface, and said wedge-shaped portion increasing in width and thickness from the end attached to said shaft means toward the outermost portion of said wedge-shaped portion before converging to a point at the extremity of said translucent means;
   and reflective coating means attached uniformly on portions of said translucent means, said reflective coating aiding said distributing means in the distribution light within said generally wedge-shaped portion.

2. A dial pointer assembly adapted for use with indirectly lighted instruments comprising:
   shaft means adapted to be rotated;
   reflector means rotating with and attached to said shaft means, said reflector means having a conical surface;
   and translucent means attached to said reflector means, said translucent means including a generally wedge-shaped portion and also including light distributing means adapted to distribute light throughout said generally wedge-shaped portion, said wedge-shaped portion increasing in width from the end attached to said shaft means toward the outermost portion of said wedge-shaped portion before converging to a point at the extremity of said translucent means.

3. A dial pointer assembly adapted for use with indirectly lighted instruments comprising:
shaft means adapted to be rotated;
and translucent means attached to said shaft means, said translucent means including a generally wedge-shaped portion and also including light distributing means adapted to distribute light throughout said generally wedge-shaped portion, said wedge-shaped portion increasing in one dimension from the end attached to said shaft means toward the outermost portion of said wedge-shaped portion before converging to a point at the extremity of said translucent means.

4. Apparatus to provide illumination for the movable portion of an indicator comprising:
reflecting means having a symmetrical shape for reflecting light rays received from a light source so that said light rays are reflected in a direction substantially parallel to the axis of symmetry;
light conducting means having at least one bevelled reflective surface to disperse said light rays received from said reflecting means, said light conducting means increasing in width and thickness from the end nearest said axis of symmetry toward the extremity of said light conducting means before converging at the extremity to thereby increase the angle of reflection of said light rays for the purpose of increasing the amount of light received at the extremity of said light conducting means thereby providing uniform illumination throughout said light conducting means;
and holding means for holding said reflecting means and said light conducting means in operative relationship, said holding means including means adapted to be rotated.

5. Apparatus to provide illumination for the movable portion of an indicator comprising:
reflecting means for reflecting light rays received from a light source so that said light rays are reflected in a direction substantially parallel to an axis of rotation;
light conducting means having a bevelled reflective surface disposed to receive light from said reflecting means, said light conducting means increasing in at least one dimension from the end nearest said axis of rotation toward the extremity of said light conducting means before converging at the extremity to thereby increase the angle of reflection of said light rays for the purpose of increasing the amount of light received at the extremity of said light conducting means thereby providing uniform illumination throughout said light conducting means;
and holding means for holding said reflecting means and said light conducting means in operative relationship, said holding means including means adapted to be rotated.

6. Indicator pointer apparatus adapted to provide uniform illumination comprising, in combination:
hub means;
light source means attached to said hub means;
means for supplying power to said light source means;
and translucent pointer means including a tip portion, said pointer means being attached to said hub means for allowing light rays from said light source to pass into said pointer means, and said pointer means increasing in thickness and in width from said hub to said tip portion to increase the angle of reflection from the exterior surfaces of said pointer means and thereby provide uniform illumination throughout said pointer means and tip portion.

7. Indicator pointer apparatus adapted to provide uniform illumination comprising, in combination:
hub means;
radiation source means attached to said hub means;
means for supplying power to said radiation source means;
and radiant energy conductive pointer means including a tip portion, said pointer means being attached to said hub means for allowing energy from said radiation source to pass into said pointer means, and said pointer means increasing in width from said hub to said tip portion to increase the angle of reflection from the exterior surfaces of said pointer means and thereby provide uniform illumination throughout said pointer means and tip portion.

8. Indicator pointer apparatus adapted to provide uniform illumination comprising, in combination: hub means;
radiation source means attached to said hub means;
means for supplying power to said radiation source means;
and radiant energy conductive pointer means including a tip portion, said pointer means being attached to said hub means for allowing energy from said radiation source to pass into said pointer means, and said pointer means increasing in at least one dimension from said hub to said tip portion to increase the angle of reflection from the exterior surfaces of said pointer means and thereby provide uniform illumination throughout said pointer apparatus.

9. Apparatus providing uniform illumination throughout a pointer section of an indicator comprising, in combination:
shaft means adapted for rotation by a motive means;
a light source means;
translucent means including a tip portion, said pointer means being attached to said shaft means and adapted to receive light rays from said light source means via said shaft means, and said pointer means increasing in at least one dimension from the end attached to said shaft means to the tip portion before converging at the tip to thereby increase the angle of light reflection within said pointer means and provide adequate light at said tip portion to obtain uniform illumination throughout the pointer section.

10. Indicator pointer apparatus adapted to provide uniform illumination throughout the pointer section comprising, in combination:
hub means including reflecting means;
and translucent pointer means including a tip portion, said pointer means increasing in one dimension from said hub to the tip portion to thereby increase the angle of illuminating reflections within said pointer for the purpose of providing uniform illumination throughout said pointer apparatus, said pointer means receiving the illumination from an energy source via said reflecting means, and said pointer means being attached to said hub means.

References Cited in the file of this patent

UNITED STATES PATENTS

| | | |
|---|---|---|
| 2,251,021 | Nebergall | July 29, 1941 |
| 2,314,817 | Christensen | Mar. 23, 1943 |
| 2,794,314 | Slaugh | July 4, 1957 |
| 2,837,053 | Viret | June 3, 1958 |
| 2,874,671 | Blackwell et al. | Feb. 24, 1959 |
| 2,902,970 | Kadlec | Sept. 8, 1959 |
| 3,033,155 | Beckman | May 8, 1962 |

FOREIGN PATENTS

| | | |
|---|---|---|
| 282,774 | Switzerland | Aug. 16, 1962 |